Patented Aug. 1, 1950

2,516,987

UNITED STATES PATENT OFFICE 2,516,987

METHOD OF PRODUCING PURIFIED BRINE

David W. Hengerer, Norwalk, Conn., assignor to International Salt Company, New York, N. Y., a corporation of New Jersey No Drawing. Application March 10, 1948, Serial No. 14,162

9 Claims. (Cl. 23—89)

This invention relates to an improved method for producing purified sodium chloride brine, and particularly for producing sodium chloride brine having an extremely low calcium and magnesium impurity content.

The invention renders possible the production of brines of extremely high purity which are suitable for use in various industrial processes requiring brines having only a very low content of undesirable impurities. Such processes include the electrolytic production of chlorine and the manufacture of sodium hypochlorite from sodium chloride brines.

The invention provides a simplified continuous method for producing high purity brine, which method may be carried out entirely in a single salt dissolving and purifying apparatus.

The invention further provides a method for producing high purity brine by means of chemical precipitating reagents, which method utilizes appreciably smaller excess quantities of the precipitating reagents than are normally required in previous purification procedures employing such reagents. These and other novel features and advantages of the invention will become apparent from the following description.

Heretofore, when brine of extremely low impurity content has been required, as for example, brine for the electrolytic production of chlorine wherein the magnesium and calcium impurities are allowable only in amounts less than about five parts per million, the brine has been produced either by dissolving the highest grade of purified sodium chloride in distilled water, or by dissolving any grade of sodium chloride, such as rock salt, in available water, and thereafter treating the resulting brine by a sequence of auxiliary purifying processes, such as by mixing precipitating reagents with the saturated brine and allowing the reaction products to settle before the brine is decanted off and filtered. Both of these methods are relatively more expensive and require considerably more equipment, labor and attention than the method of this invention.

One modification of the present invention by which a sodium chloride brine having extremely low calcium and magnesium impurity content may be produced comprises passing pre-treated water, containing precipitating reagents, through a bed of salt such as common rock salt or other grade of salt. The depth of the salt bed through which the aqueous feed solution is passed is maintained at a predetermined height by a conventional feed hopper and associated control device. The feed solution is sprayed or otherwise delivered onto the upper portion of the salt bed and is allowed to flow through the salt bed by gravity, the rate of flow of the feed solution through the salt bed and the depth of the salt bed being regulated so as to produce saturated brine before the solution enters the final section of the salt bed so that no more sodium chloride can be dissolved as the solution passes through this section. As a result, the lower section of the salt bed serves as a filter medium for the saturated brine solution.

The feed water is pre-treated with at least the stoichiometrical amounts of soda ash ($Na_2CO_3$) and caustic soda (NaOH) for reacting with all the soluble calcium and magnesium compounds in the feed water and also with the amounts of such compounds which normally would become dissolved in the brine during the passage of the solution through the salt bed to form the corresponding insoluble precipitates. The insoluble products, principally calcium carbonate and magnesium hydroxide, which result from reaction of the soda ash and caustic soda with the soluble calcium and magnesium compounds in the feed water are temporarily held in suspension in the feed solution and are subsequently filtered out during passage of the solution through the salt bed. The insoluble products, principally calcium carbonate and magnesium hydroxide, with various other metallic hydroxides such as ferric hydroxide, which result from reaction of the soda ash and caustic soda with the soluble impurities leached out of the salt bed as the brine solution flows therethrough, are immediately precipitated out of the solution and are filtered out in the salt bed. The accumulated mass of precipitated compounds which is built up in the lower portion of the salt bed, and the lower portion of the salt bed itself from which no sodium chloride is dissolved, provide a highly effective filter medium for filtering the precipitated compounds out of the brine. As the effluent brine leaves the salt bed, it is saturated, sparkling clear and has a very low undesirable impurity content. The acidity of the saturated brine solution may be modified, as desired, by the addition of a suitable acid such as muriatic acid through a pH controller.

At predeterminable intervals, the salt bed is replaced with fresh salt so as to prevent the mass of precipitated compounds from accumulating to an extent such that inefficient or uneconomic conditions will result.

The soda ash and caustic soda may be added to the feed water in mixing tanks from which the feed solution is drawn off and passed to the salt bed, but these precipitating reagents are advantageously added in regulated amounts to the feed water as the water flows to the salt bed, the turbulence of the flowing stream being utilized to mix them thoroughly into the water. In the latter event, the precipitating reagents or treating compounds may be fed into the stream of feed water in the form of concentrated solutions or in the dry state, conventional metering or feeding devices being utilized to effect the desired regulated additions.

To assure the most effective removal of the undesired impurities, it is advisable to employ the precipitating reagents in amounts slightly in excess of those indicated by the stoichiometrical requirements. It has been common practice to utilize excess amounts of soda ash and caustic soda when purifying a brine solution by the mixing, settling, decanting and filtering method heretofore employed, but one of the advantages of this invention is that it requires substantially less excess amounts of soda ash and caustic soda than are normally required by the purification method heretofore employed for producing sparkling clear brines having substantially equivalent quantities of calcium and magnesium impurities. The reduced excess amounts of the precipitating reagents required when utilizing the method of this invention may possibly be attributable to the fact that the undesirable impurities which are taken up from the salt by the brine solution never actually pass into solution because they are immediately reacted in situ with the precipitating reagents to produce insoluble compounds.

The following table demonstrates the effectiveness of and degree of purification obtained by the method of this invention.

*Brine analysis table*

[All figures in grams per liter of saturated brine]

| | Calcium (Ca) | Magnesium (Mg) | Soda Ash $Na_2CO_3$ | Caustic Soda (NaOH) |
|---|---|---|---|---|
| Feed water | 0.0157 | 0.0010 | nil | nil |
| Brine 1 | 0.5688 | 0.0020 | nil | nil |
| Brine 2 | 0.0043 | 0.0002 | 0.3180 | 0.1120 |

Brine 1 was produced by the method described, except that the feed water was untreated. Brine 2 was produced by the method described, using the same grade and brand of salt as used to produce brine 1, but the feed water had been pretreated so as to contain 2.37 grams of soda ash per liter and 0.285 gram of caustic soda per liter (which are equivalent to 8.97 grams of soda ash per gallon and 1.06 grams of caustic soda per gallon).

As indicated from the foregoing table, the amounts of soda ash and caustic soda employed in the production and purification of brine 2 were respectively about 0.3180 and 0.1120 gram per liter of brine in excess of the stoichiometrical requirements. This excess amount of soda ash is approximately three-eighths (3/8) of the usual standard soda ash excess of 0.8 gram per liter, and the excess amount of caustic soda is approximately one-third (1/3) of the usual standard caustic soda excess of 0.3 gram per liter which are used to obtain similar brine purities of less than five parts per million in conventional purification systems where these same precipitating reagents are mixed with the saturated brine solution.

The stoichiometrical requirements of soda ash and caustic soda to effect substantially complete removal of all soluble calcium and magnesium compounds which would normally be contained in the saturated brine can be calculated from an analysis of a brine produced by passing untreated feed water through the salt bed, or from available information as to the soluble calcium and magnesium impurity content of the feed water and salt.

The method of this invention may be applied equally well in revivifying partially spent brines. For example, the required amounts of precipitating reagents may be added to partially spent aqueous brine such as used in canning processes and which may contain suspended foreign material as well as undesirable soluble impurities. This pretreated aqueous brine is then filtered down through a salt bed according to the procedure described above. As the brine solution passes through the salt bed it again becomes saturated, the suspended foreign materials are filtered out, and the soluble calcium, magnesium and other precipitable impurities in the spent brine solution as well as those removed from the salt during passage of the brine solution therethrough are converted by the precipitating reagents into insoluble compounds which are filtered out in the salt bed, and particularly in the lower filtering section thereof. The effluent brine is saturated and clarified and contains substantially no calcium or magnesium impurities.

Sodium chloride brines produced in accordance with this invention are sparkling clear physically and are as pure chemically with respect to their calcium and magnesium content as brines made for electrolytic processes by other more expensive and relatively inefficient methods. Although a specific example has been set out herein giving certain proportions of the precipitating reagents employed, and although the extent of the reduction in the excess amounts of the precipitating reagents required with the method of the invention over the excess amounts of such reagents normally required with standard brine purification procedures using such reagents has been indicated, the invention is not limited to the proportions of ingredients indicated in either of these two manners.

I claim:

1. In a method for producing purified sodium chloride brine by passing an aqueous feed solution down through a bed of salt having a depth sufficient to saturate the solution with sodium chloride before the solution has passed completely through the salt bed, the improvement which comprises adding soda ash and caustic soda to the feed solution prior to passing said solution into the salt bed, whereby the compounds in the feed solution and those removed from the salt during passage of the solution through the salt bed, and which are convertible to insoluble precipitates by reaction with soda ash or caustic soda are so converted to insoluble precipitates, and simultaneously filtering the brine solution through said salt bed to remove said insoluble precipitates from the brine.

2. In a method for producing purified sodium chloride brine by passing an aqueous feed solution down through a bed of salt having a depth sufficient to saturate the solution with sodium chloride before the solution has passed completely through the salt bed, the improvement which comprises adding soda ash and caustic soda to the feed solution prior to passing said solution into the salt bed, whereby the compounds removed from the salt during passage of the solution through the salt bed and which are convertible to insoluble precipitates by reaction with soda ash or caustic soda are so converted to insoluble precipitates.

3. The process as defined in claim 2, in which said compounds are converted in situ to insoluble precipitates as the salt is being dissolved by said solution.

4. In a method for producing purified sodium chloride brine by passing an aqueous feed solution down through a bed of salt having a depth sufficient to saturate the solution with sodium chloride before the solution has passed completely through the salt bed, the improvement which comprises adding soda ash and caustic soda to the feed solution prior to passing said solution into the salt bed, whereby the calcium and magnesium compounds in the feed solution and those removed from the salt during passage of the solution through the salt bed are converted into insoluble precipitates, and simultaneously filtering the brine solution through said salt bed to remove said insoluble precipitates from the brine.

5. The process according to claim 4, in which said insoluble precipitates are removed from the brine solution by filtration of the brine solution through the lower undissolved portion of said salt bed.

6. The process according to claim 4, in which said insoluble precipitates are removed from the brine solution by filtration of the brine solution through a body of said precipitates which have been retained in the lower undissolved portion of said salt bed.

7. The process according to claim 4, in which the soda ash and caustic soda are added to the feed solution in amounts sufficient to provide an excess thereof over the stoichiometrical requirements for converting all the said calcium and magnesium compounds into insoluble precipitates, said excess of soda ash being approximately equivalent to 0.3 gram per liter of saturated brine, and said excess of caustic soda being approximately equivalent to 0.1 gram per liter of saturated brine.

8. The method of producing saturated sodium chloride brine containing substantially no calcium or magnesium impurities, comprising the steps of pre-treating an aqueous feed solution by mixing therewith predetermined amounts of soda ash and caustic soda, passing such pre-treated feed solution down through a salt bed having a depth sufficient to saturate the solution with sodium chloride before the solution has passed completely through the salt bed, whereby the soluble calcium and magnesium compounds removed from the salt during passage of the solution through the salt bed are substantially entirely converted by the soda ash and caustic soda in the solution into insoluble precipitates, and simultaneously filtering the brine solution through said salt bed to remove said insoluble precipitates from the brine.

9. The process as defined in claim 8, in which the amounts of soda ash and caustic soda added to the feed solution are sufficient to convert to insoluble precipitates substantially the entire amount of the calcium and magnesium compounds in the feed solution as well as those removed from the salt during passage of the solution through the salt bed.

DAVID W. HENGERER.

REFERENCES CITED

The following references are of record in the file of this patent:

UNITED STATES PATENTS

| Number | Name | Date |
| --- | --- | --- |
| 299,774 | Garrigues | June 3, 1884 |
| 1,520,920 | Yngve | Dec. 30, 1924 |
| 2,412,106 | Swartz | Dec. 3, 1946 |
| 2,433,601 | Comstock | Dec. 30, 1947 |